United States Patent
Ham et al.

(10) Patent No.: US 6,700,554 B2
(45) Date of Patent: *Mar. 2, 2004

(54) TRANSMISSIVE DISPLAY DEVICE USING MICRO LIGHT MODULATOR

(75) Inventors: Yong Sung Ham, Kyounggi-do (KR); Heum Il Baek, Seoul (KR); Je Hong Kim, Kyounggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 163 days.

This patent is subject to a terminal disclaimer.

(21) Appl. No.: 09/727,515

(22) Filed: Dec. 4, 2000

(65) Prior Publication Data

US 2001/0013847 A1 Aug. 16, 2001

(30) Foreign Application Priority Data

Dec. 4, 1999 (KR) ............................ P99-55025
Dec. 31, 1999 (KR) ............................ P99-68071

(51) Int. Cl.[7] .................. G09G 3/20; G09G 3/22; G09G 5/00
(52) U.S. Cl. ............ 345/75.2; 345/211; 345/212; 345/213; 345/214
(58) Field of Search ............ 345/84, 102, 108, 345/150, 211–214, 725, 75.2; 359/223, 233, 291, 227; 349/177

(56) References Cited

U.S. PATENT DOCUMENTS

| | | | | |
|---|---|---|---|---|
| 4,248,501 A | * | 2/1981 | Simpson | 359/227 |
| 5,717,422 A | * | 2/1998 | Fergason | 359/233 |
| 5,757,536 A | * | 5/1998 | Ricco et al. | 359/224 |
| 5,774,257 A | * | 6/1998 | Shibata et al. | 359/291 |
| 5,867,302 A | * | 2/1999 | Fleming | 359/291 |
| 6,356,254 B1 | * | 3/2002 | Kimura | 349/177 |
| 6,360,033 B1 | * | 3/2002 | Lee et al. | 385/18 |
| 6,411,423 B2 | * | 6/2002 | Ham | 359/290 |
| 6,421,160 B2 | * | 7/2002 | Ham | 359/223 |

* cited by examiner

Primary Examiner—Vijay Shankar
Assistant Examiner—Prabodh M. Dharia
(74) Attorney, Agent, or Firm—Birch, Stewart, Kolasch & Birch, LLP

(57) ABSTRACT

A transmissive display device using a micro light modulator that is capable of improving a light efficiency. In the display device, light-path converting members are provided on stationary members to change a path of a light inputted obliquely through stationary members and movable members vertically with respect to a display screen.

17 Claims, 17 Drawing Sheets

INCIDENT LIGHT

INCIDENT LIGHT

TRANSMISSIVE DISPLAY DEVICE USING MICRO LIGHT MODULATOR

BACKGROUND OF THE INVENTION

1. Field of the Invention

The present invention relates to a display device for modulating a light beam to display a picture, and more particularly to a transmissive display device using a micro light modulator that is capable of improving light efficiency.

2. Description of the Related Art

There have been studies made of various flat panel display devices which are expected to be next generation display devices. Such flat panel display devices include a liquid crystal display (LCD) and a plasma display panel (PDP) using a gas discharge, etc. which are now available in the market. The LCD has disadvantages in that it has a narrow viewing angle and a slow response speed and that its fabrication process is complicated because thin film transistors (TFT's), used as switching devices and electrodes, etc. are formed by a semiconductor fabrication process. On the other hand, the PDP has an advantage in that its fabrication process is simple, and can provide a large-dimension screen. However, the PDP has a disadvantage in that it has low discharge and luminescence efficiencies.

Accordingly, studies have been conducted toward the development of a novel display device capable of overcoming such problems in the flat panel devices. Recently, there has been suggested a transmissive display device that is provided with a micro light modulator for each pixel using a micro electromechanical system (MEMS) as an ultra-fine processing technique so as to display a picture.

FIG. 1A and FIG. 1B are schematic section views showing a structure of a transmissive display device using a micro light modulator that has been disclosed in Korean Patent Application No. 10-1999-0043554 filed on Oct. 8, 1999 by the Applicant. Referring to FIGS. 1A and 1B, the transmissive display device includes a plurality of lower stationary electrodes 12 provided on a substrate 13 in line with and at a desired distance from each other, and a plurality of movable electrodes 11 overlapping with the lower stationary electrodes 12 in response to a voltage. The lower stationary electrodes 12 are formed in a stripe shape on the substrate 13. Each of the upper movable electrodes 11 has each end fixed to the substrate and has a center portion floated, by a desired distance, from the substrate 13. The lower stationary electrodes 12 and the upper movable electrodes 11 are controlled by an electrical signal and function to open and close a light path by the effect of static electricity occurring between each other depending on whether the device is in a display state or in a non-display state.

In the non-display state as shown in FIG. 1A, a desired voltage is applied to the lower stationary electrodes 12 and the upper movable electrodes 11. Then, since an attraction caused by the presence of static electricity on the lower stationary electrodes 12 and the upper movable electrodes 11, the upper movable electrodes 11 contact the lower stationary electrodes 12 adjacent thereto. As a result of the contact between the lower stationary electrodes 12 and the upper movable electrodes 11 the light from a back light is shut off (not shown).

On the other hand, in the display state as shown in FIG. 1B, no voltage is applied to the lower stationary electrodes 12 and the upper movable electrodes 11. Since the upper movable electrodes 11 are returned to their primary states by their elastic forces, they are suspended at a distance from the substrate 13 and the lower stationary electrodes 12. At this time, a light path is provided between each lower stationary electrode 12 and each upper movable electrode 11. A light from a backlight (not shown) is transmitted, via the light path, to a display screen to display a picture or an image.

In such a transmissive display device using a micro light modulator, a light from the back light is inputted at a desired inclined angle (i.e., 60° to 80°) with respect to the substrate 13. Thus, it is necessary to control the light path vertically with respect to the display screen so that an observer positioned perpendicularly to the display screen can view a picture at a higher brightness.

To this end, as shown in FIG. 2, an upper substrate (not shown) includes first and second prism sheets 16a and 16b for changing a path of a light transmitting obliquely between the lower stationary electrodes 12 and the upper movable electrodes 11 vertically with respect to the display screen, and a diffusion sheet 18 provided on the prism sheets 16a and 16b. A prism pattern having a triangular section is formed at each of the first and second prism sheets 16a and 16b in a direction perpendicular to each other. The diffusion sheet 18 functions to diffuse light inputted from the second prism sheet 16b.

SUMMARY OF THE INVENTION

Accordingly, it is an object of the present invention to provide a transmissive display device using a micro light modulator that is adaptive for improving light efficiency.

In order to achieve these and other objects of the invention, a transmissive display device using a micro light modulator according to an embodiment of the present invention includes light-path converting members, being provided on stationary members, for changing the path of a light inputted obliquely through stationary members and movable members vertically with respect to a display screen.

A transmissive display device using a micro light modulator according to another embodiment of the present invention includes light-path converting members, being provided on stationary members, for changing the path of a light inputted obliquely between stationary members and movable members vertically with respect to a display screen and for constantly keeping a distance between a rear substrate and a front substrate opposed to each other.

A transmissive display device using a micro light modulator according to still another embodiment of the present invention includes light-path converting members, being provided on stationary members, for changing the path of a light inputted obliquely between stationary members and movable members vertically with respect to a display screen, wherein an angle of an incidence surface at one side of the light-path converting members is set to more than 52° on the basis of a display screen.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Figure 1A:
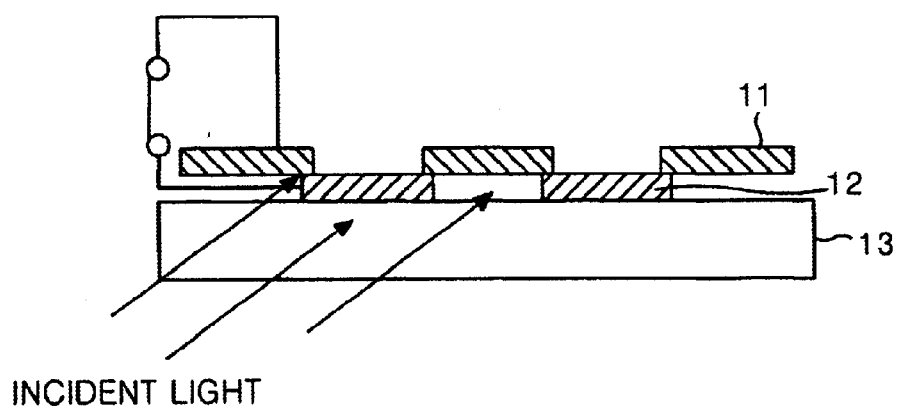
FIG. 1A and FIG. 1B are schematic section views showing a structure of a conventional transmissive display device using a micro light modulator.
Figure 1B:
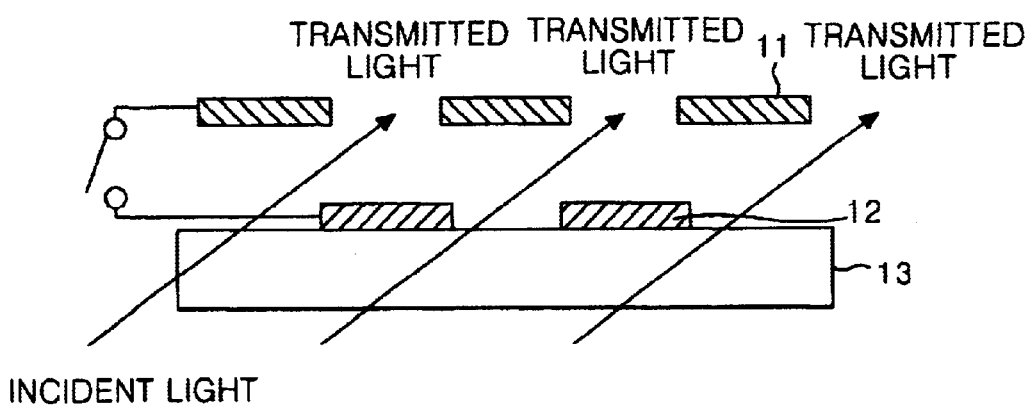
Figure 2:
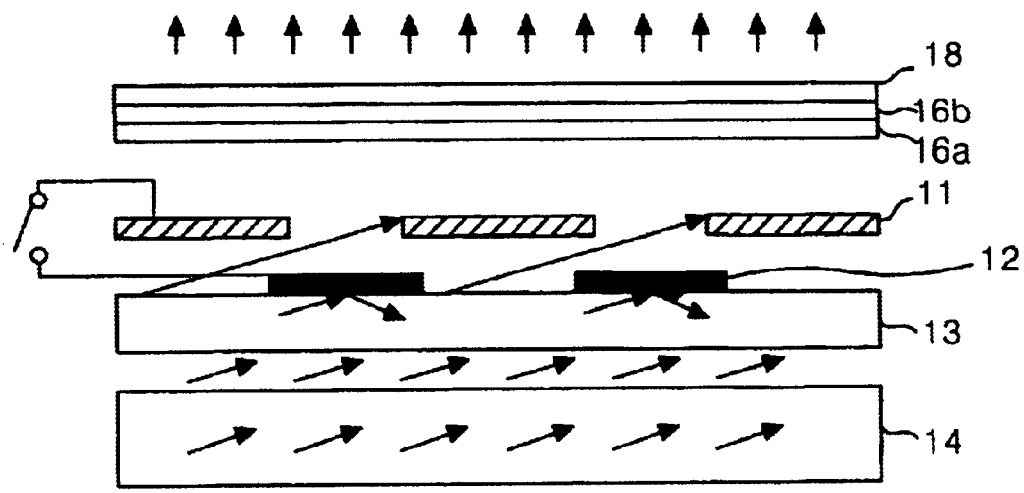
FIG. 2 is a section view showing a structure of the front substrate and the rear substrate in the display device shown in FIG. 1A and FIG. 1B.
Figure 3A:
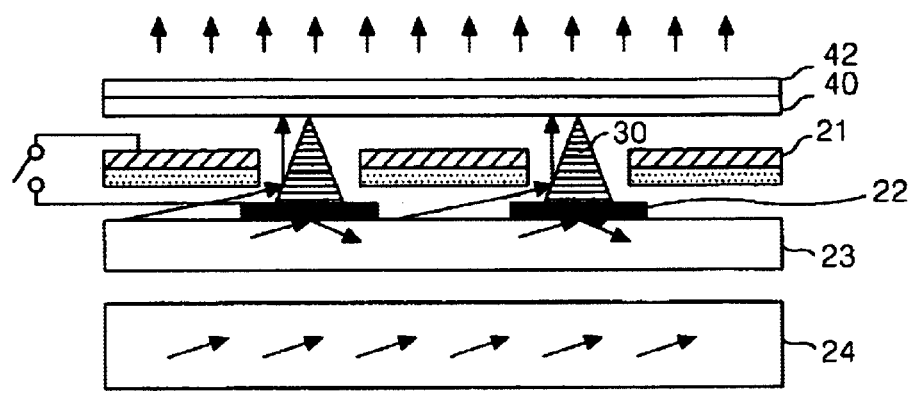
FIG. 3A and FIG. 3B are schematic section views showing a structure of a transmissive display device using a micro light modulator according to a first embodiment of the present invention.
Figure 3B:
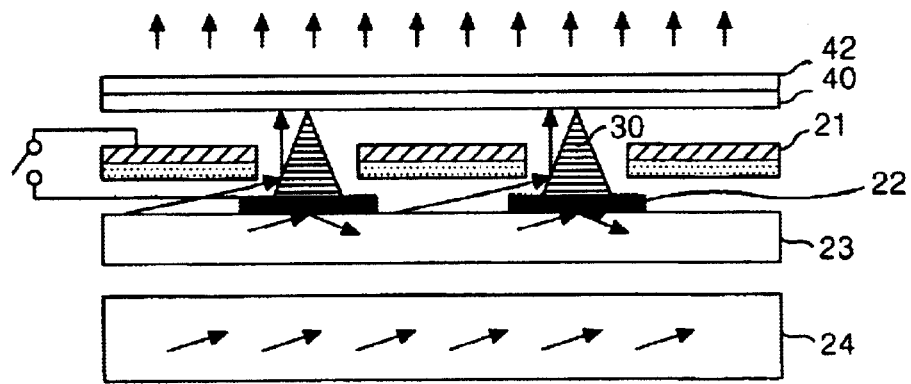
Figure 4:
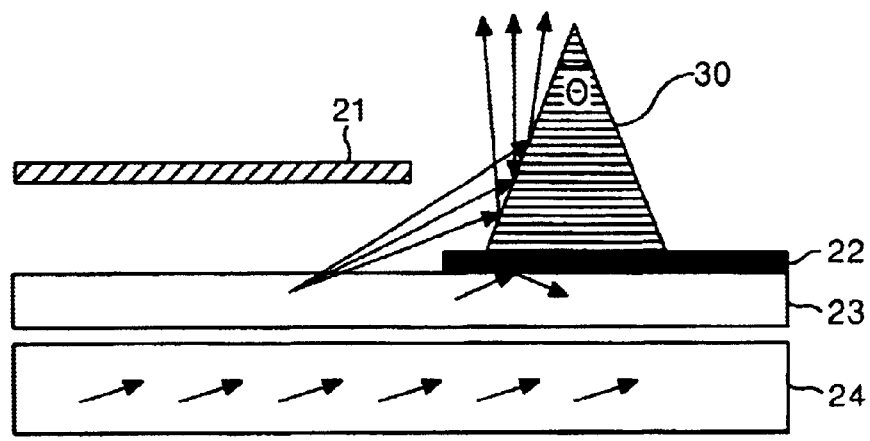
FIG. 4 is a detailed section view of a first embodiment of the protrusion shown in FIGS. 3A and 3B.

Referring to FIG. 3A and FIG. 3B, there is shown a transmissive display device using a micro light modulator according to a first embodiment of the present invention. The transmissive display device includes a plurality of lower stationary electrodes 22 provided on a substrate 23 in line with and at a desired distance from each other, triangular protrusions 30 formed on the lower stationary electrodes 22, and a plurality of movable electrodes 21 overlapping with the lower stationary electrodes 22. The lower stationary electrodes 22 are patterned into a stripe shape on the substrate 23, and arranged in such a manner to be spaced, by a desired distance, from the adjacent lower stationary electrodes 22. Each end of the upper movable electrodes 21 is curved toward the substrate 23 to be fixed onto the substrate 23, and overlaps with each side of the lower stationary electrodes 22 in the longitudinal direction. The center portions of the upper movable electrodes 21 make a plane and is floated, by a desired height, from the substrate 23. The lower stationary electrodes 22 and the upper movable electrodes 21 are controlled by an electrical signal and function to open and close a light path by the force of static electricity exerted on each other depending on whether the device is in a display state or in a non-display state. The lower stationary electrodes 22 are preferably formed from a conductive opaque material while the upper movable electrodes 21 are preferably formed from an opaque material having a good elastic property. The triangular protrusion 30 is formed in a stripe shape on each of the lower stationary electrodes 22 and has a triangle section. The triangular protrusion 30 functions to change a light transmitting obliquely between the upper stationary electrodes 21 and the lower movable electrodes 22 and being incident thereto vertically with respect to the substrate 23. To this end, upper vertical angles θ of the triangular protrusion 30 are set to an acute angle as shown in FIG. 4 because a light from a back light 24 is inputted at about 60° to 80°. The triangular protrusions 30 are made from a metal material having a high reflectivity such as aluminum (Al), or silver (Ag), etc., or the surfaces thereof are preferably coated with a metal material having a high reflectivity. The triangular protrusions 30 can be formed by entirely depositing a metal material with a high reflectivity on the front substrate 40 and thereafter etching the same. It is not necessary to install prism sheets at the front substrate 40 because a light is vertically turned by the triangular protrusions. Accordingly, the front substrate 40 is provided with only black matrices for dividing a diffusion layer and a pixel cell and color filters for displaying a color.

An operation of the transmissive display device using the micro light modulator will be described below.

In a non-display state as shown in FIG. 3A, a desired voltage is applied to the lower stationary electrodes 22 and the upper movable electrodes 21. Then, since an attraction caused by the force of static electricity force exerted on the lower stationary electrodes 22 and the upper movable electrodes 21, the upper movable electrodes 21 make contact with the lower stationary electrodes 22 adjacent thereto. At this time, the lower stationary electrodes 22 and the upper movable electrodes 21 shut off light from the back light installed at the rear side of the substrate 23.

On the other hand, in a display state as shown in FIG. 3B, no voltage is applied to the lower stationary electrodes 22 and the upper movable electrodes 21. Then, since the upper movable electrodes 21 are returned to their primary states by their elastic forces, they are suspended at a distance from the substrate 23 and the lower stationary electrodes 22. At this time, a light path is formed between each lower stationary electrode 22 and each upper movable electrode 21. A light from the back light 24 is incident to one inclined surface of the triangular protrusion 30 via the light path. A light incident to the inclined surface of each triangular protrusion 30 is reflected in a direction perpendicular to the substrate 23 to be progressed into a display screen.

Figure 5:
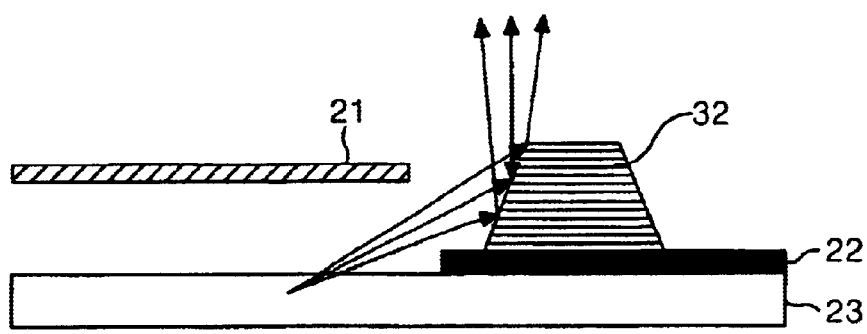
FIG. 5 is a detailed section view of a second embodiment of the protrusion shown in FIGS. 3A and 3B.
Figure 6:
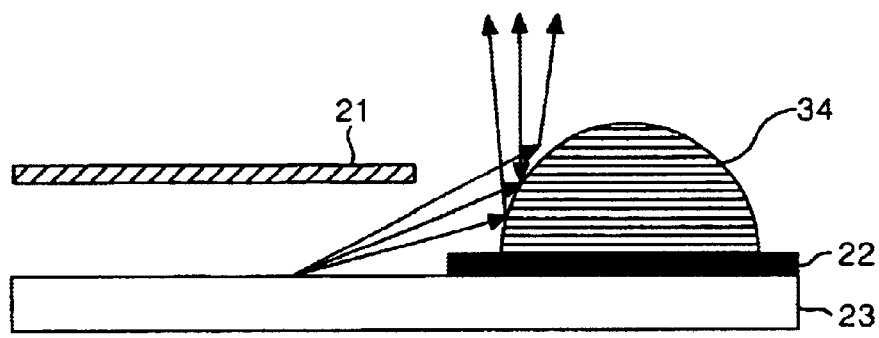
FIG. 6 is a detailed section view of a third embodiment of the protrusion shown in FIGS. 3A and 3B.
Figure 7:
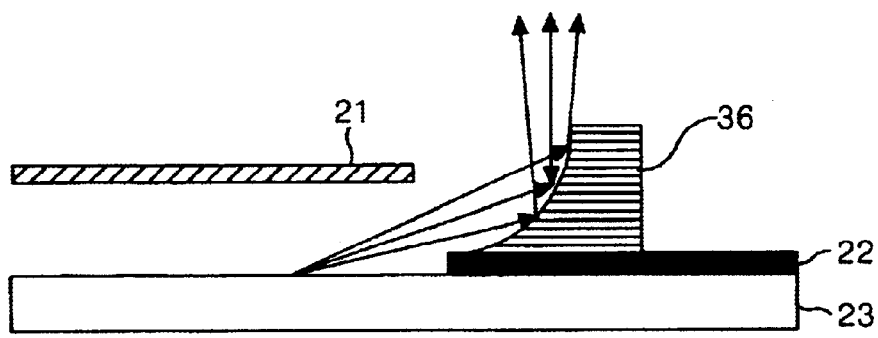
FIG. 7 is a detailed section view of a fourth embodiment of the protrusion shown in FIGS. 3A and 3B.

FIG. 5 to FIG. 7 show other embodiments of the protrusion. Referring to FIGS. 5 to 7, protrusions 32, 34 or 36 formed on the lower stationary electrodes 22 have a trapezoidal section, a semi-circular section or an asymmetrical polyhedron section, respectively. The protrusions 32, 34 and 36 are formed from a metal material having a high reflectivity and vertically reflects light inputted obliquely at a desired angle from the backlight 24.

Figure 8:
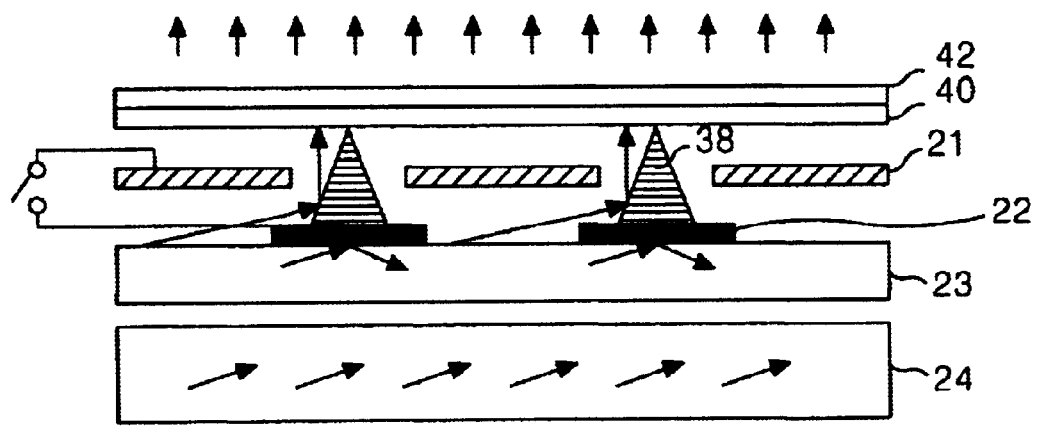
FIG. 8 is a schematic section view showing a structure of a transmissive display device using a micro light modulator according to a second embodiment of the present invention.

Referring to FIG. 8, there is shown a transmissive display device using a micro light modulator according to a second embodiment of the present invention. The transmissive display device includes protrusions 38 for reflecting light inputted from a back light 24 vertically with respect to a substrate 23 and for constantly keeping a distance between a front substrate 40 and the rear substrate 23. These protrusions 38 have a triangular section as shown in FIG. 8. Alternately, the protrusions 38 may have a trapezoidal section, a semi-circular section or an asymmetrical polyhedron section as mentioned above. The protrusions 38 are formed from a metal with a high reflectivity and function to turn a light inputted obliquely thereto vertically with respect to the substrates 23 and 40. Also, the protrusions 38 serve as spacers for providing support between the front substrate 40 and the rear substrate 23. A diffusion layer 42 for diffusing a light inputted from each protrusion 38 is provided on the front substrate 40.

Figure 9A:
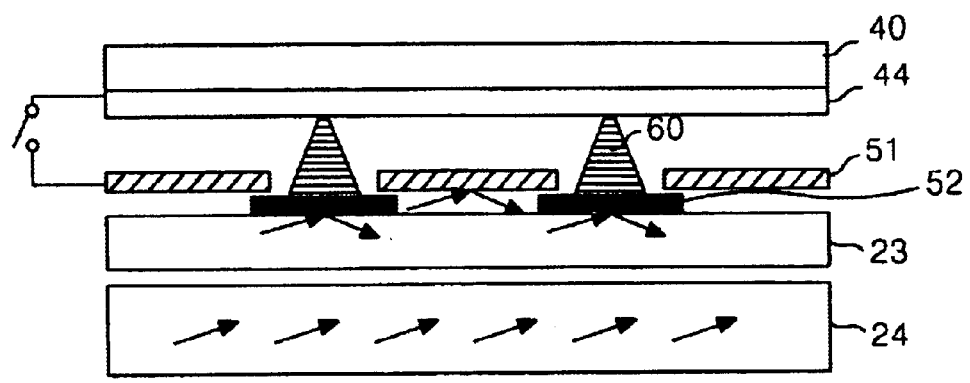
FIG. 9A and FIG. 9B are schematic section views showing a structure of a transmissive display device using a micro light modulator according to a third embodiment of the present invention.
Figure 9B:
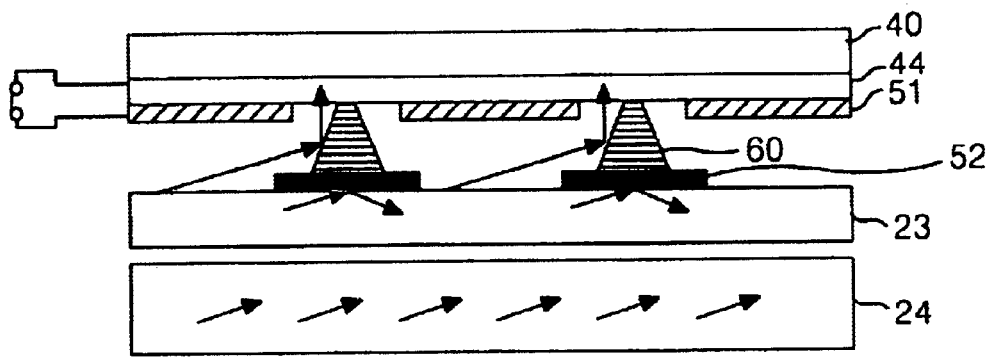

Referring to FIG. 9A and FIG. 9B, there is shown a transmissive display device using a micro light modulator according to a third embodiment of the present invention. The transmissive display device includes lower light-shielding layers 52 formed in:parallel to and at a desired distance from each other on a rear substrate 23, trapezoidal protrusions 60 formed on the lower light-shielding layers 52, upper movable electrodes 51 overlapping with the lower light-shielding layers 52 adjacent thereto, and upper stationary electrodes 44 provided on a front substrate 40. The lower light-shielding layers 52 are patterned into a stripe shape on the substrate 23, and arranged in such a manner to be spaced, by a desired distance, from the adjacent lower light-shielding layers 52. The lower light-shielding layers 52 function to shut off light inputted from a back light 24. The trapezoidal protrusions 60 reflect a light from the backlight 24 vertically with respect to the substrates 23 and 40. Also, the protrusions 60 serve as spacers for constantly keeping a distance between the front substrate 40 and the rear substrate 23. Each end of the upper movable electrodes 51 is curved toward the rear substrate 23 to be fixed onto the rear substrate 23 and overlaps with each side of the lower light-shielding layers 52 in the longitudinal direction. The center portion of each upper movable electrode 51 makes a plane and is floated, by a desired height, from the rear substrate 23. The upper movable electrode 51 is driven upward and downward with a voltage applied between the upper stationary electrode 44 and the upper movable electrode 52 to open and close a light path between the upper movable electrode 51 and the lower light-shielding layer 52. The upper stationary electrodes are formed from a transparent electrode material such as indium tin oxide (ITO) by entirely depositing it on the front substrate 40 or patterning it into a stripe shape.

An operation of such a transmissive display device using the micro light modulator will be described below.

In a non-display state as shown in FIG. 9A, no voltage is applied to the upper stationary electrodes 44 and the upper movable electrodes 51. Then, the upper stationary electrodes are positioned adjacently to the lower light-shielding layers 52 or kept in contact with the adjacent lower light-shielding layers 52. At this time, a light from the back light 24 is shut off by the lower light-shielding layers 52 and the upper movable electrodes 51.

On the other hand, in a display state as shown in FIG. 9B, a desired voltage is applied to the upper stationary electrodes 44 and the upper movable electrodes 51. Then, the upper movable electrodes 51 are absorbed into the upper stationary electrodes 44 by virtue of an attraction caused by static electricity. At this time, a light path is formed between each lower light-shielding layer 52 and each upper movable electrode 51. Light from the back light 24 is incident to one inclined surface of the trapezoidal protrusion 60 via the light path. A light incident to the inclined surface of each trapezoidal protrusion 60 is reflected in a direction perpendicular to the substrates 23 and 44 to be progressed into a display screen.

An optical condition such as an inclination angle of the protrusions 30, 32, 34 and 36 should be set so that a light reflected by the protrusions 30, 32, 34 and 36 can be input vertically with respect to the display screen. This optical condition of the trapezoidal protrusion 32 shown in FIG. 5 will be described in detail as an example.

Figure 10:
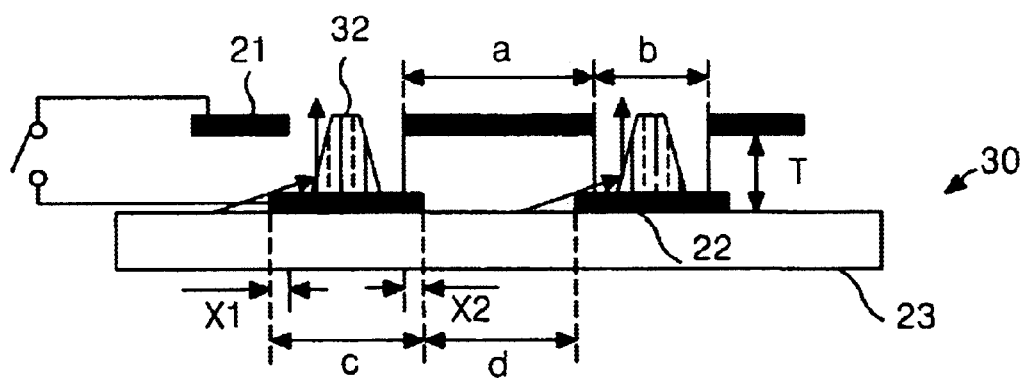
FIG. 10 is a section view representing a width of the electrode patterns, and a distance and an overlapping width therebetween in the display device provided with a trapezoidal protrusion shown in FIG. 5.
Figure 11:
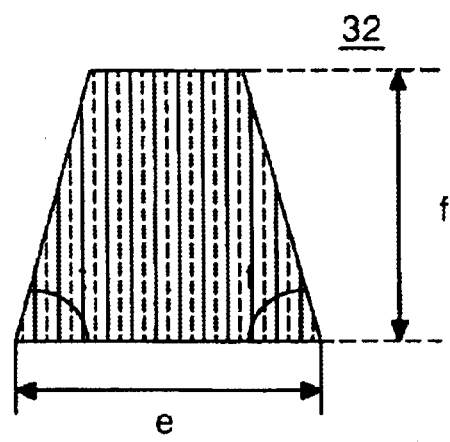
FIG. 11 is a section view representing an angle of inclination, a height and the bottom side of the trapezoidal protrusion shown in FIG. 10.

Referring to FIG. 10, it is assumed that an electrode width of each upper movable electrode 21 is "a"; a width between the upper movable electrodes 21 is "b"; an electrode width of each lower stationary electrode 22 is "c"; and a distance between the lower stationary electrodes 22 is "d". Also, it is assumed that an overlap width between the right side of the upper movable electrode 21 and the left side of the lower stationary electrode 22 is "X1"; and an overlap width between the left side of the upper movable electrode 21 and the right side of the lower stationary electrode 22 is "X2". In consideration of such width and distance, an inclination angle t of the trapezoidal protrusion 32 should be set to a proper angle so as to turn an incident light vertically with respective to the display screen and make a light distribution having a symmetrical shape around the front surface thereof.

A distance T between the upper movable electrode 21 and the lower stationary electrode 22 is 2.5 $\mu$m. When it is assumed that a=2 $\mu$m, b=8 $\mu$m, c=12 $\mu$m, d=8 $\mu$m, and X1=X2=2 $\mu$m, an optimal inclination angle t of the trapezoidal protrusion 32 is determined on a basis of, a simulation as will be described below.

Figure 12:
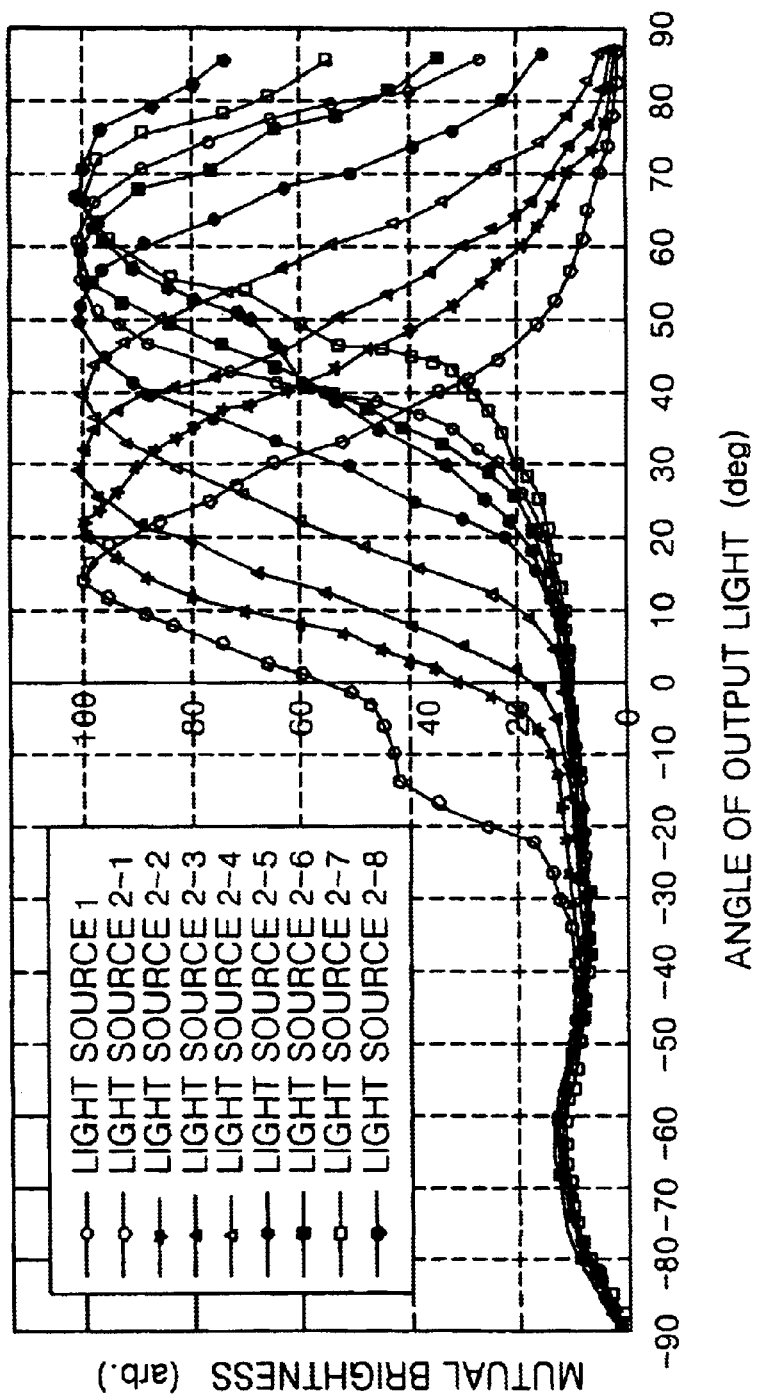
FIG. 12 is a characteristic graph representing a light distribution of light sources for a simulation with respect to a light efficiency characteristic of the display device provided with the trapezoidal protrusion shown in FIG. 10.
Figure 13:
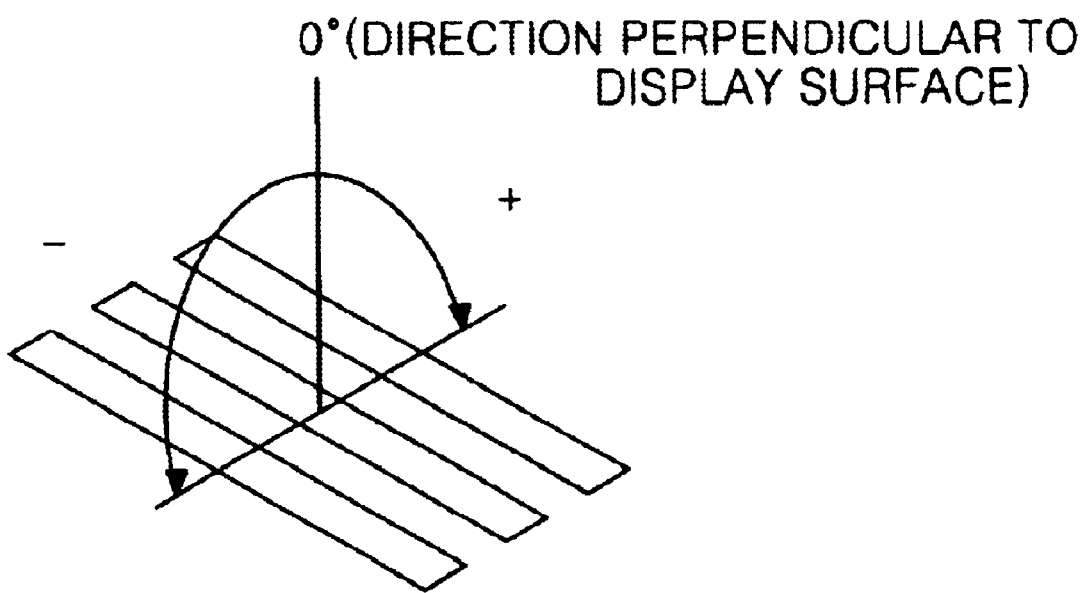
FIG. 13 illustrates a light distribution of light sources in a short axial direction of the electrode in the case of being set to 0° when an output light is vertical with respect to the display screen in the display device provided with the trapezoidal protrusion shown in FIG. 10.

FIG. 12 is a profile representing a directional distribution of light sources used for a simulation, and FIG. 13 represents an output light distribution in a short axial direction of the electrode patterns. In FIG. 12, the horizontal axis represents an inclination angle of an output light assumed to be 0° when an output light makes a right angle with respect to the display screen. The vertical axis represents brightness. Herein, the light source 1 is a backlight consisting of only a lamp assay, a reflective sheet and a patterned light guide. The light sources 2-1 through 2-8 are change a direction of an output light successively by a desired angle on a basis of the light source 1.

Figure 14:
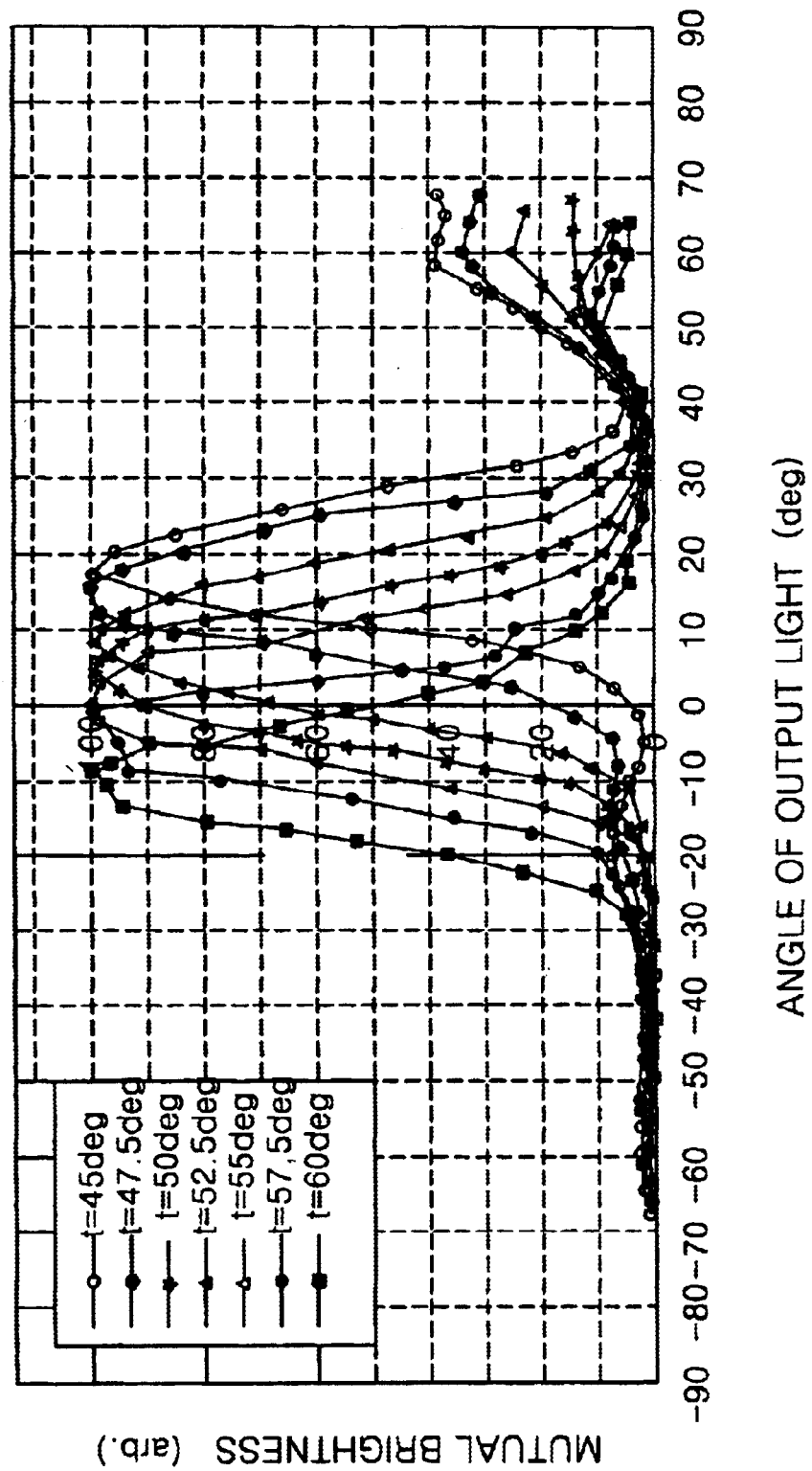
FIG. 14 is a characteristic graph representing a light distribution according to a variation in an inclination angle of the trapezoidal protrusion when the first light source shown in FIG. 12 is applied to a simulation light source.

FIG. 14 represents an output light distribution according to a variation in the inclination angle t of the trapezoidal protrusion 32 when the light source 1 is used as a simulation light source. Herein, a height f and a bottom side e of the trapezoidal protrusion 32 are fixed to 4 $\mu$m and 8 $\mu$m, respectively, whereas an inclination angle t changes at an interval of 2.5° from 45° until 60°. As can be seen from FIG. 14, when the inclination angle t is 55°, an output light of the light source 1 becomes symmetrical on a basis of a vertical direction of the display screen.

Figure 15:
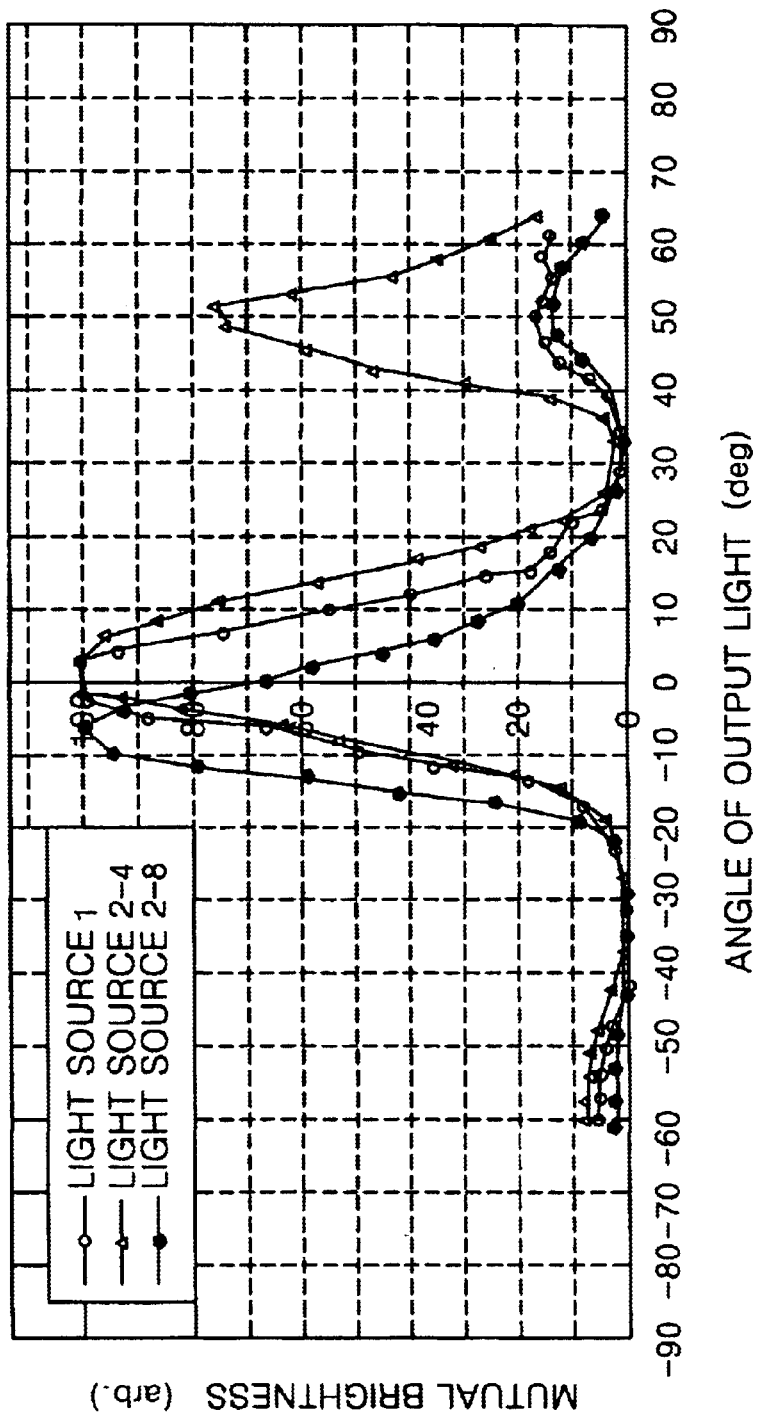
FIG. 15 is a characteristic graph representing an output light distribution of the light sources shown in FIG. 12 when an inclination angle of the trapezoidal protrusion shown in FIG. 11 is 55°.

FIG. 15 shows a simulation result of various light sources at a condition of an inclination angle of 55° when a height f and a bottom side e of the trapezoidal protrusion 32 has been fixed to 4 μm and 8 μm, respectively. Herein, the used light sources are the light source 1 having a maximum brightness value when a light reflected by the trapezoidal protrusion 32 to pass through the display screen makes a right angle with respect to the display screen, and the light sources 2-4 and 2-8 having a maximum brightness value shifted farthest from an angle (i.e., 0°) vertical to the display screen. The light source 2-4 shows a maximum brightness value at an output light of +4° while the light source 2-8 shows a maximum brightness value at an output light of −7°.

Meanwhile, in FIG. 15, a side lobe having a high brightness value at a position where an angle of an output light is close to approximately 50° is a light component being not reflected by the trapezoidal protrusion 32 and passing through the display screen.

As can be seen from FIG. 15, an angle of a light going to the display screen can be controlled by an adjustment of the inclination angle t of the trapezoidal protrusion 32 with respect to a light having a maximum brightness value shifted in a positive(+) direction or a negative(−) direction on a basis of 0°. In other words, it is possible to obtain a maximum brightness value at 0° by the adjustment of the inclination angle t of the trapezoidal protrusion 32. For instance, when the maximum brightness value is shifted toward the negative(−) direction from 0°, the inclination angle t of the trapezoidal protrusion 32 is adjusted to be less than 55°. Then, the maximum brightness value is shifted into 0°. On the other hand, when the maximum brightness value is shifted toward the positive(+) direction from 0°, the inclination angle t of the trapezoidal protrusion 32 is adjusted to be more than 55°. Then, the maximum brightness value is shifted into 0°.

Figure 16:
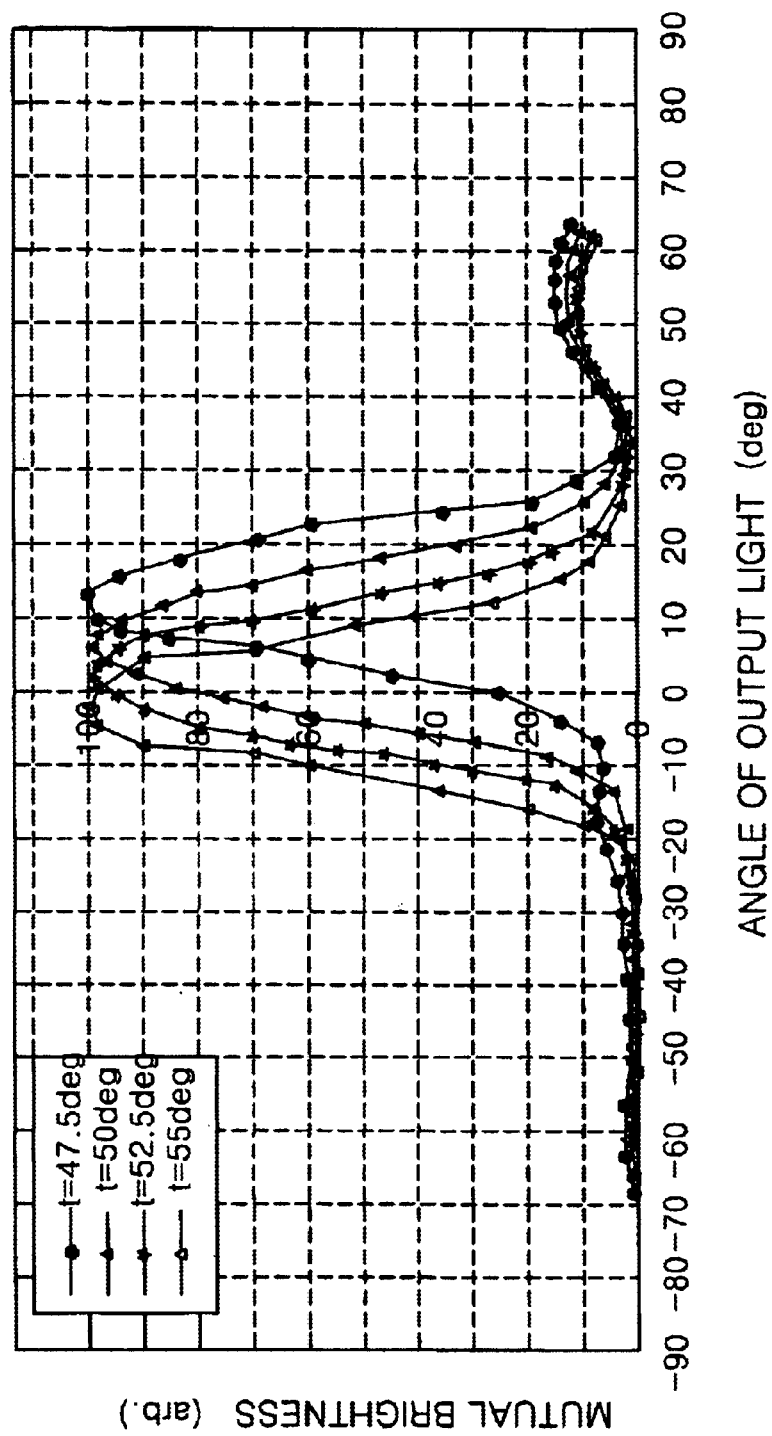
FIG. 16 is a characteristic graph representing an output light distribution of the second to eighth light sources shown in FIG. 12 when an inclination angle of the trapezoidal protrusion in shown in FIG. 11 has been changed at an interval of 2.5° from 47.5° until 55°.

FIG. 16 shows an output light distribution of the light source 2-8 when an inclination angle t of the trapezoidal protrusion 32 is changed at an interval of 2.5° from 47.5° to 55°. As can be seen from FIG. 16, in the case of the light source 2-8, an output light distributions in the positive(+) direction and in the negative(−) direction are symmetrical to each other on a basis of an angle of 0° with respect to the display screen when the inclination angle t of the trapezoidal protrusion 32 is approximately 52.5°. The results of simulating all of the used light sources show that an inclination angle t of the trapezoidal light-path converting member allowing an output light distribution in the positive(+) direction and in the negative(−) direction to be symmetrical to each other on a basis of 0° should be in a range of about 52° to 59°.

Figure 17:
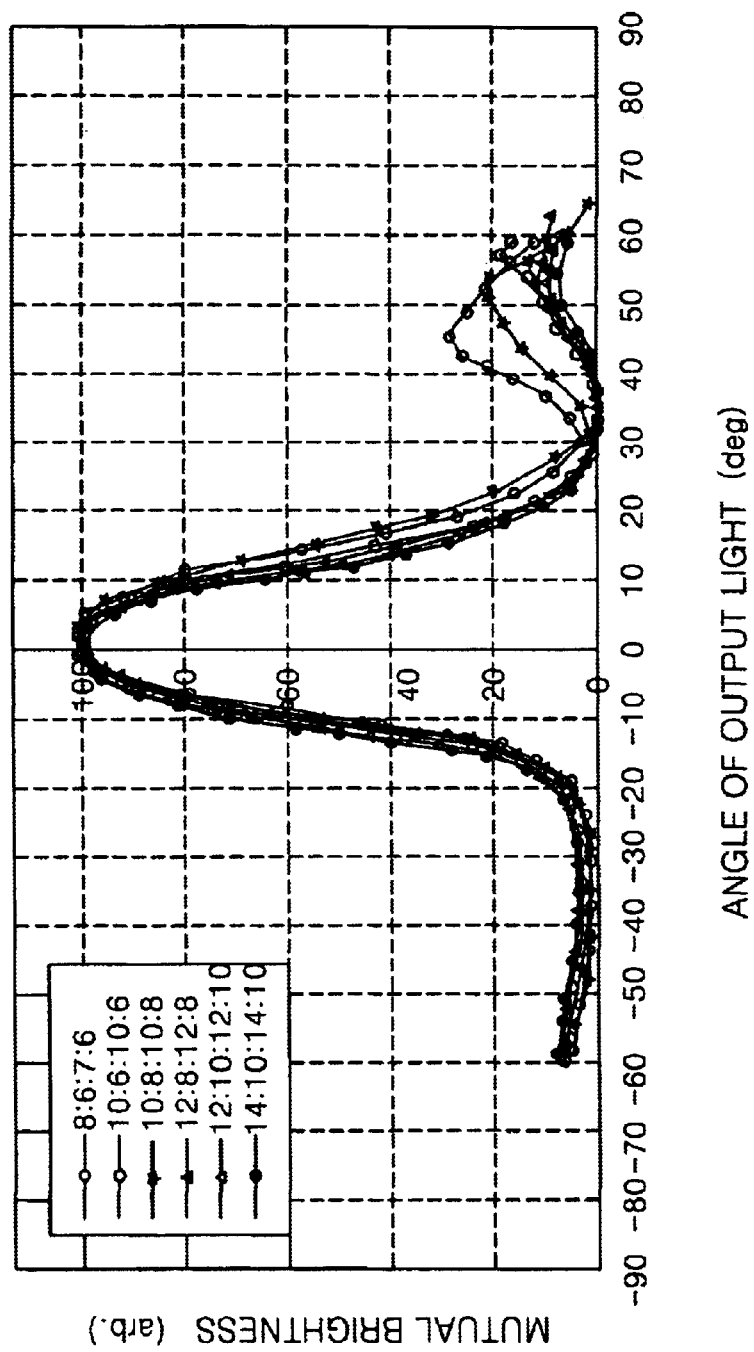
FIG. 17 is a characteristic graph representing an output light distribution according to a variation in a size of the electrode patterns shown in FIG. 10 and a distance therebetween.

Assuming that the light source 1 be used as a light source for the display device employing the micro light modulator according to the present invention, a maximum brightness value of an output light passing through the display screen when a size of and a distance between the electrode patterns 21 and 22 is changed as indicated in the following table exists in a range of ±3° on a basis of an angle (i.e., 0°) vertical to the display screen as shown in FIG. 17. A simulation result according to a change in the inclination angle t of the trapezoidal protrusion 32 shows that, when the light source 1 is used, a maximum brightness value of an output light appears at 0° and thus an inclination angle t of the trapezoidal protrusion 32 being symmetrical to each other in the positive(+) direction and the negative(−) direction should be determined to have an angle within a range of about 52° to 58°.

TABLE 1

| a : b : c : d | x1 : x2 |
|---|---|
| 8 : 6 : 8 : 6 | 1 : 1 |
| 10 : 6 : 10 : 6 | 2 : 2 |
| 10 : 8 : 10 : 8 | 1 : 1 |
| 12 : 8 : 12 : 8 | 2 : 2 |
| 12 : 10 : 12 : 10 | 1 : 1 |
| 14 : 10 : 14 : 10 | 2 : 2 |

When overlap widths X1 and X2 between the electrode patterns 21 and 22 are changed, an inclination angle t of the trapezoidal protrusion 32 allowing a light passing through the display screen to be 0° is determined as follows. The inclination angle t of the trapezoidal protrusion 32 is 55°, and a width of and a distance between the electrode patterns 21 and 22 is fixed into a=12 μm, b=8 μm, c=12 μm and d=8 μm.

Figure 18:
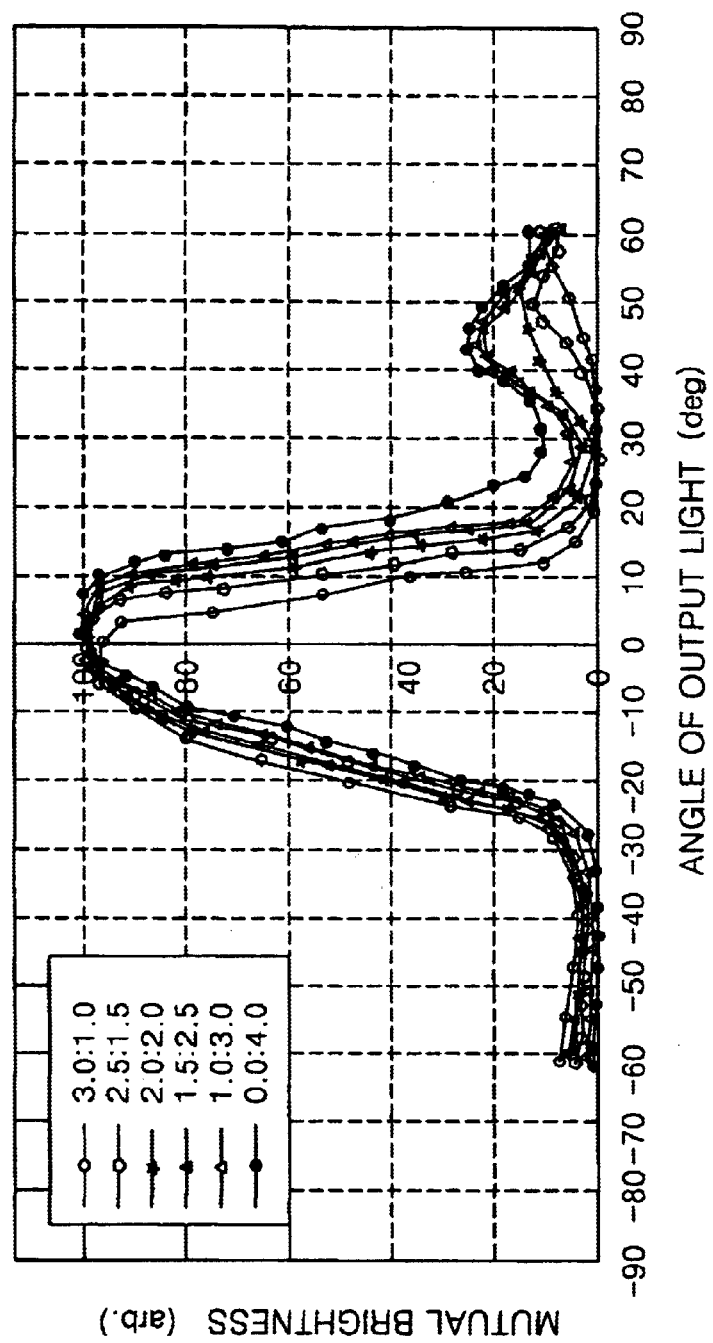
FIG. 18 is a characteristic graph representing an output light distribution according to a variation in an overlapping width between the electrode patterns shown in FIG. 10.

FIG. 18 shows an output light distribution of the light source 1 according to a change in a ratio of X1 to X2 when an inclination angle t of the trapezoidal protrusion 32 is 55°, a height f thereof is 4 μm, and a bottom side e thereof is 8 μm. As can seen from FIG. 18, when an inclination angle t of the trapezoidal protrusion 32 is 55°, a light from the light source 1 according to a change in a ratio of X1 to X2 is outputted in a range from 0° to ±3°. Thus, an optimal condition of the inclination angle t of the trapezoidal protrusion 32 allowing a light from the light source 1 to be outputted vertically with respect to the display screen for all of the X1 and X2 is in a range of approximately 52° to 58°.

Figure 19:
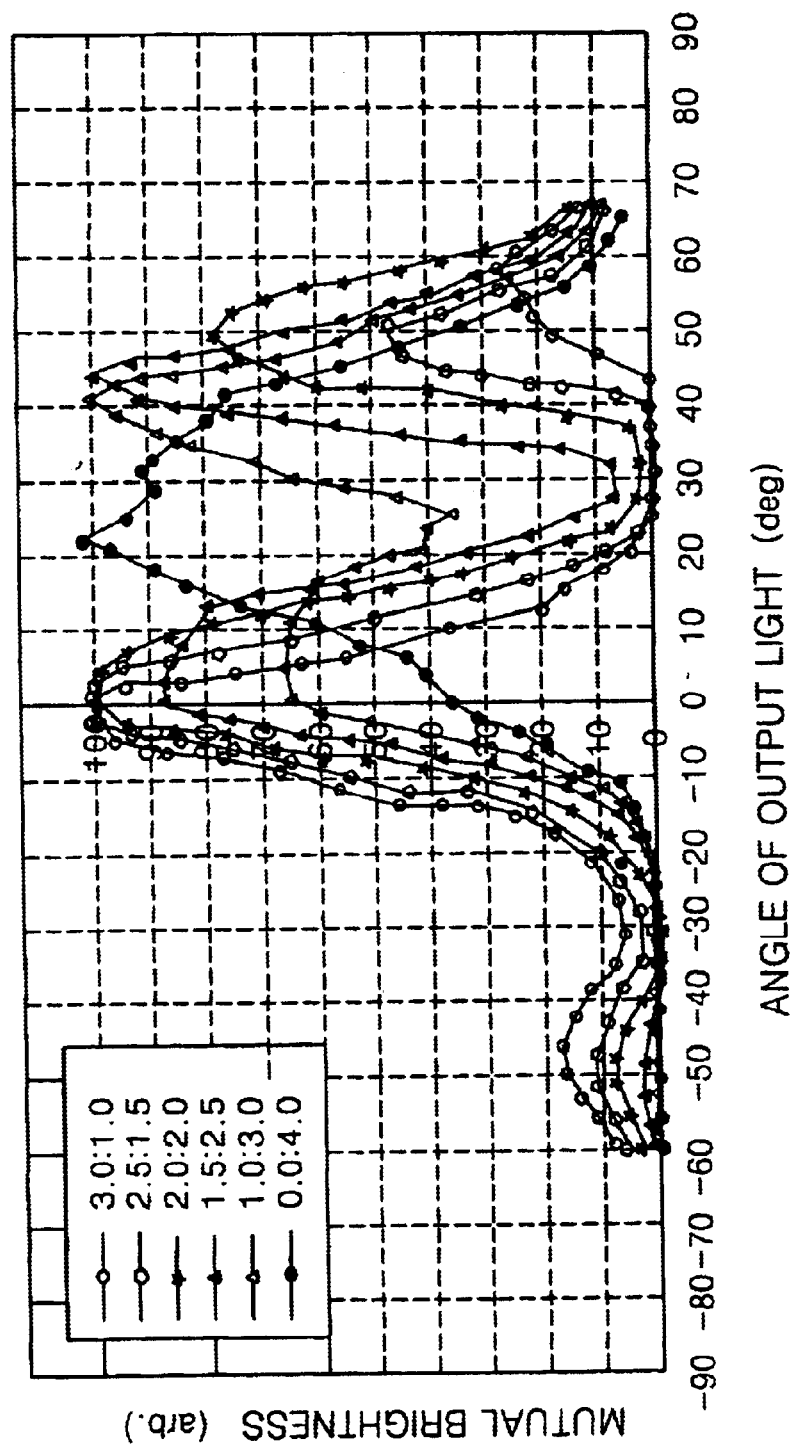
FIG. 19 is a characteristic graph representing an output light distribution of the second and third light sources according to a variation in an overlapping width of the electrode patterns shown in FIG. 10.

FIG. 19 shows an output light distribution when the light source 2-3 is used; a width of and a distance between the electrode patterns are fixed into a=12 μm, b=8 μm, c=12 μm and d=8 μm; and X1 and X2 are changed in accordance with the condition as shown in FIG. 18. As can be seen from FIG. 19, when a length of X1 is changed from 3.0 μm into 1.5 μm, a light having a maximum brightness value of light components from the light source 2-3 is outputted at 0°. On the other hand, when a length of X1 is less than 1.0°, a light having a maximum brightness value is shifted in the positive (+) direction to be outputted. When the output light is shifted in the positive(+) direction, a maximum brightness value appears at two angles of +24° and 44° to 44°.

Figure 20:
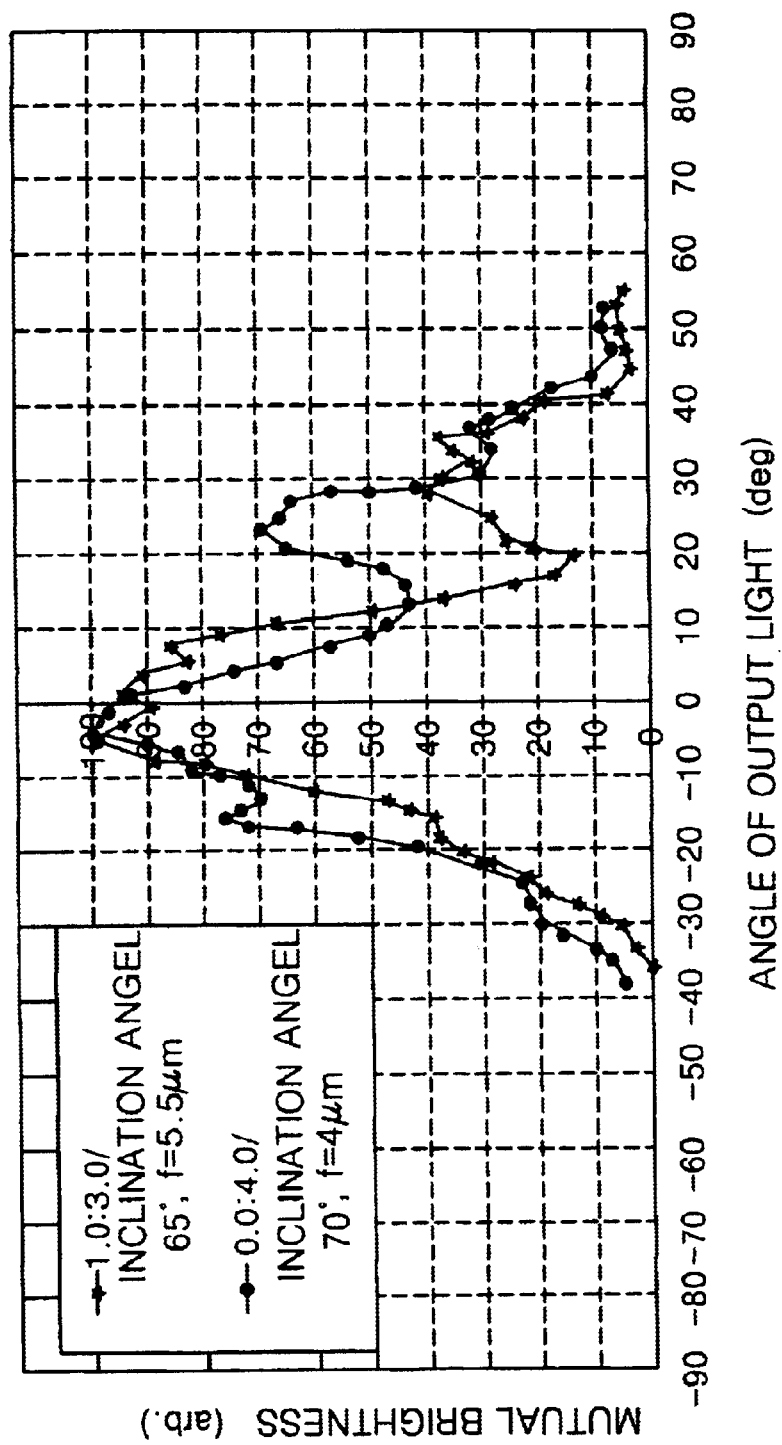
FIG. 20 is a characteristic graph representing an output light distribution according to a variation in a height of the trapezoidal protrusion shown in FIG. 11.

FIG. 20 shows a distribution of a output light from the light source 2-3 when a bottom side e of the trapezoidal protrusion 32 is fixed into 8 μm, and an inclination angle t and a height h thereof are changed from 65° and 5.5 μm into 70° and 4 μm, respectively. Herein, a length of X1 is set to 10 μm and 0.0 μm.

As a result, a generalization of simulation data for determining the inclination angle t as mentioned above shows that an inclination angle t of the trapezoidal protrusion 32 should be set to an angle between a minimum angle of 52° and a maximum angle of 70° in consideration of an optional light source, and a width, a distance and an overlap width of the electrode patterns 21 and 22. Also, a height f of the trapezoidal protrusion 32 should be larger than a distance T between the electrode patterns 21 and 22 so as to obtain an optimal output light distribution and an optimal light efficiency. A length of the bottom side should be smaller than a width b between the upper movable electrodes 21 so as to realize a black state when an electric field is applied to the electrode patterns 21 and 22.

As described above, the transmissive display device using the micro light modulator according to the present invention has stationary members and movable members for being driven with a static electricity force to open and close a light path and has light-path converting members provided on the stationary members to change a path of a light inputted obliquely from the back light vertically with respect to the display screen. Accordingly, the present transmissive display device can improve light efficiency by about five times in comparison to the conventional display device using separate prism sheets. As can be seen from a simulation result, an inclination angle making the incidence surface and the bottom surface of the light-path converting member, a height thereof and a length of the bottom side thereof can be designed to have optimum values such that a light reflected by the light-path converting member makes a right angle with respect to the display screen.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A transmissive display device using a micro light modulator, said device comprising:
   a plurality of stationary members and a plurality of movable members, said movable members being floatedly suspended above said stationary members to open and close a light path;
   light-path converting members, being provided on the stationary members, for changing a path of a light inputted obliquely through the stationary members and the movable members vertically with respect to a display screen, said light-path converting members being different from said movable members.

2. The transmissive display device according to claim 1, wherein the light-path converting members are made from a material having a high reflectivity.

3. The transmissive display device according to claim 2, wherein the light-path converting members are selected from any one of aluminum (Al) and silver (Ag).

4. The transmissive display device according to claim 3, wherein each of the light-path converting members has a triangular section, a trapezoidal section, a semi-circular section or an asymmetrical polyhedron section.

5. The transmissive display device according to claim 1, wherein the movable members are provided on a rear substrate, and the stationary members are provided on a front substrate opposed to the rear substrate.

6. The transmissive display device according to claim 5, further comprising:
   light-shielding members, being provided on the rear substrate in such a manner to overlap with each side of the movable members, for shutting off an incident light.

7. A transmissive display device using a micro light modulator, said device comprising:
   a plurality of stationary members and a plurality of movable members to open and close a light path, said movable members being floatedly suspended above said stationary members;
   light-path converting members, being provided on the stationary members, for changing a path of a light inputted obliquely between the stationary members and the movable members vertically with respect to a display screen and for constantly keeping a distance between a rear substrate and a front substrate opposed to each other, said light-path converting members being different from said movable members.

8. The transmissive display device according to claim 7, wherein the light-path converting members are made from a material having a high reflectivity.

9. The transmissive display device according to claim 7, wherein the light-path converting members are selected from any one of aluminum (Al) and silver (Ag).

10. The transmissive display device according to claim 7, wherein each of the light-path converting members has a triangular section, a trapezoidal section, a semi-circular section or an asymmetrical polyhedron section.

11. A transmissive display device using a micro light modulator, said device comprising:
    a plurality of stationary members and a plurality of movable members to open and close a light path, said movable members being floatedly suspended above said stationary members;
    light-path converting members, being provided on the stationary members, for changing a path of a light inputted obliquely between the stationary members and the movable members vertically with respect to a display screen said light-path converting members being different from said movable members,
    wherein an angle of an incidence surface at one side of the light-path converting members is set to more than 52° on a basis of a display screen.

12. The transmissive display device according to claim 11, wherein the light-path converting members are made from a material having a high reflectivity.

13. The transmissive display device according to claim 12, wherein the light-path converting members are selected from any one of aluminum (Al) and silver (Ag).

14. The transmissive display device according to claim 13, wherein each of the light-path converting members has a triangular section, a trapezoidal section, a semi-circular section or an asymmetrical polyhedron section.

15. The transmissive display device according to claim 11, wherein an angle of an incidence surface at one side of the light-path converting members is set in a range of 52° to 70° on a basis of a display screen.

16. The transmissive display device according to claim 11, wherein the light-path converting members have a larger height than a distance between the stationary members and the movable members.

17. The transmissive display device according to claim 11, wherein a length of the bottom sides of the light-path converting members is set to be smaller than a distance between the movable members.

* * * * *